UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

ELECTRIC BATTERY AND METHOD OF PREPARING MANGANESE MATERIAL THEREFOR.

1,385,151.   Specification of Letters Patent.   Patented July 19, 1921.

No Drawing.   Application filed February 26, 1919.   Serial No. 279,404.

*To all whom it may concern:*

Be it known that I, OTTO E. RUHOFF, a citizen of the United States, residing at Madison, in the county of Dane and State of Wisconsin, have invented a certain new and useful Improvement in Electric Batteries and Methods of Preparing Manganese Material Therefor, of which the following is a specification.

This invention relates to electric batteries, both of the type in which there is a bibulous lining of pulp board or similar material close to the zinc can, and also the other type, in which the depolarizing material is compressed around the carbon pencil, and in which a suitable electrolyte is poured into the space between the core or bobbin and the zinc can.

The object of the invention is to prepare material for, and construct such batteries in which depolarizing material is of such a character that the battery will deliver a maximum amount of electric energy. Incidentally, the battery will also show less deterioration when kept in storage on the shelves of merchants vending such batteries.

The invention consists in the preparation of and use in a battery of a manganese ore which has been roasted and treated with acid previous to its use in the battery, as distinguished from ordinary " manganese " which has heretofore been used in the ore form in which it is mined, except for such mechanical separation of impurities as is found necessary. It also consists in the features and details which will be hereafter more fully set forth in the specification and claims.

One ingredient of the depolarizing mixture of the battery is commonly some ore of manganese present largely or wholly in some form of dioxid. The common practice in the past has been to use such manganese ores in dry batteries without preliminary treatment other than crushing to a desired degree of fineness. I have found after extensive experimentation that if these manganese ores are subjected to treatment before being used in dry batteries, the resulting product is greatly improved. A preferred method of treatment consists in placing a suitable quantity of the manganese ore in a suitable receptacle and subjecting it to a moderate heating, usually until it reaches somewhat above a visible red heat, although in some cases a somewhat higher temperature may be used. The heating may take place with or without the presence of reducing substances.

After cooling the roasted manganese ore is treated with a dilute acid, such as sulfuric or muriatic acid until practically no more of the manganese will go into solution. The residue which refuses to go into solution is then filtered in water and dried, or not, as desired. The resulting product is a manganese compound of superior depolarizing power and of great reactivity in a battery. These advantages may be due to the greater porosity of the final product over the material at hand to begin with, or may be due to certain changes in the chemical and physical nature of the resulting compound.

During the heating, a part or all of the dioxid present in the ore is reduced to a lower oxid. As a result of the acid treatment a certain amount of the element manganese is transformed into a sulfate or chlorid or similar salt and the remaining insoluble manganese compound is probably largely or entirely as the dioxid, either hydrated or anhydrous.

The manganese compound prepared as described is now ready for use in batteries of the same character as those in which ordinary mined manganese has been used. The material is softer than the original ore and if it is desired to maintain a definite size of grains, care must be taken not to subject it to too vigorous grinding action.

The battery material thus prepared is then placed with other ingredients necessary to constitute a battery. One such battery which has given satisfactory results contains 50 parts of the prepared manganese, 49 parts of carbonaceous material, 10 parts of sal ammoniac, and 12 parts of a zinc chlorid, 45° Baumé solution. Such a battery gives very much greater efficiency in tests than a battery using ordinary manganese ore of the old art.

Having thus described my invention, what I claim as new and desire to secure by Letters Patent, is:—

1. The method of preparing manganese for use as a battery material consisting in first roasting it at or above a visible red heat, then, after cooling, dissolving out all that a dilute acid, such as sulfuric or muriatic, will take up, then filtering and washing the residue.

2. The method of preparing manganese for use as a battery material consisting in first heating to a red heat, then, after cooling, dissolving out all that a weak acid solution will take out, removing the acid solution and washing the residue.

3. A battery material comprising roasted and acid-treated manganese dioxid ore.

4. An electric battery using a depolarizing material, one of whose elements is roasted and acid-treated manganese ore.

In witness whereof, I have hereunto subscribed my name in the presence of two witnesses.

OTTO E. RUHOFF.

Witnesses:
JAS. A. HAMILTON,
FRANK W. EIGBURY.